(12) United States Patent
Aljallis et al.

(10) Patent No.: US 12,312,171 B2
(45) Date of Patent: May 27, 2025

(54) SYSTEMS AND METHODS FOR TRANSPORTING CONTAINERS

(71) Applicant: Walmart Apollo, LLC, Bentonville, AR (US)

(72) Inventors: Elias Aljallis, Howard Beach, NY (US); Vikranth Gopalakrishnan, North Brunswick, NJ (US); Ronald S. Kyslinger, York, PA (US)

(73) Assignee: Walmart Apollo, LLC, Bentonville, AR (US)

( * ) Notice: Subject to any disclaimer, the term of this patent is extended or adjusted under 35 U.S.C. 154(b) by 216 days.

(21) Appl. No.: 18/157,023

(22) Filed: Jan. 19, 2023

(65) Prior Publication Data
US 2023/0150768 A1    May 18, 2023

Related U.S. Application Data

(63) Continuation of application No. 16/448,578, filed on Jun. 21, 2019, now Pat. No. 11,603,266.
(Continued)

(51) Int. Cl.
*B65G 1/06* (2006.01)
*B25J 5/04* (2006.01)
(Continued)

(52) U.S. Cl.
CPC ...... *B65G 1/06* (2013.01); *B25J 5/04* (2013.01); *B60P 3/007* (2013.01); *B61B 3/00* (2013.01);
(Continued)

(58) Field of Classification Search
CPC ........ B65G 1/06; B65G 1/0457; B65G 47/90; B65G 1/0492; B65G 65/00; B60P 3/007;
(Continued)

(56) References Cited

U.S. PATENT DOCUMENTS 3,448,870 A    6/1969 Gallo et al.
3,510,014 A *  5/1970 Speaker ............... B65G 47/962
                                                 198/370.04
(Continued)

FOREIGN PATENT DOCUMENTS

EP           0319880 A1    6/1989
WO     WO-9534492 A2 * 12/1995 ........... B65G 17/345

*Primary Examiner* — Tan Le
(74) *Attorney, Agent, or Firm* — Morgan, Lewis & Bockius LLP; Manita Rawat

(57) ABSTRACT

Among other things, a connection assembly for motion along a rail is disclosed. The connection assembly can include a first plate assembly, a second plate assembly, and a release assembly. The first plate assembly can include a first stop mounted to a first base. The second plate assembly can include a second stop mounted to a second base and a post mounted to the second base. The release assembly can include a rod and a spring. The rod can include an outward extension. The spring can be disposed between the extension and the second stop. The release assembly can be configured to occupy: a first state such that the spring pushes the extension against the first stop and thereby biases the first base away from the second base; and a second state such that the spring pushes the extension against the post.

20 Claims, 17 Drawing Sheets

Related U.S. Application Data

(60) Provisional application No. 62/692,522, filed on Jun. 29, 2018, provisional application No. 62/692,544, filed on Jun. 29, 2018, provisional application No. 62/692,606, filed on Jun. 29, 2018, provisional application No. 62/692,550, filed on Jun. 29, 2018.

(51) Int. Cl.
| | |
|---|---|
| *B60P 3/00* | (2006.01) |
| *B61B 3/00* | (2006.01) |
| *B61B 10/00* | (2006.01) |
| *B61B 10/02* | (2006.01) |
| *B65B 5/10* | (2006.01) |
| *B65B 43/56* | (2006.01) |
| *B65G 1/04* | (2006.01) |
| *B65G 47/90* | (2006.01) |
| *B65G 65/00* | (2006.01) |
| *G05D 1/00* | (2006.01) |
| *G05D 1/02* | (2020.01) |
| *B65G 1/137* | (2006.01) |

(52) U.S. Cl.
CPC ............... *B61B 10/02* (2013.01); *B65B 5/10* (2013.01); *B65B 43/56* (2013.01); *B65G 1/0457* (2013.01); *B65G 1/0492* (2013.01); *B65G 47/90* (2013.01); *B65G 65/00* (2013.01); *G05D 1/0212* (2013.01); *B65G 1/1373* (2013.01)

(58) Field of Classification Search
CPC ........ G05D 1/0212; B65B 5/10; B65B 43/56; B25J 5/04; B61B 3/00; B61B 10/02
See application file for complete search history.

(56) References Cited

U.S. PATENT DOCUMENTS

| | | | | |
|---|---|---|---|---|
| 4,089,404 | A | * | 5/1978 | Venzke ................ B65G 47/962 |
| | | | | 198/802 |
| 4,102,448 | A | * | 7/1978 | Wolbrink ............. B65G 47/962 |
| | | | | 105/241.1 |
| 4,200,421 | A | * | 4/1980 | Haldimann .............. B65G 1/06 |
| | | | | 414/241 |
| 4,838,036 | A | | 6/1989 | Norrie |
| 4,851,018 | A | | 7/1989 | Lazzari et al. |
| 9,558,472 | B1 | | 1/2017 | Tubilla Kuri |
| 9,592,759 | B1 | | 3/2017 | Theobald |
| 9,957,107 | B2 | | 5/2018 | Peng |
| 10,343,844 | B2 | | 7/2019 | Edme |
| 11,603,266 | B2 | * | 3/2023 | Aljallis .................. B65G 65/00 |
| 2008/0086231 | A1 | | 4/2008 | Kim |
| 2015/0032252 | A1 | | 1/2015 | Galluzzo et al. |
| 2016/0214797 | A1 | | 7/2016 | Pankratov et al. |
| 2017/0066592 | A1 | | 3/2017 | Bastian, II et al. |
| 2017/0166356 | A1 | | 6/2017 | Tubilla Kuri |
| 2017/0174431 | A1 | | 6/2017 | Borders et al. |
| 2018/0127212 | A1 | | 5/2018 | Jarvis et al. |
| 2018/0244473 | A1 | | 8/2018 | Mathi et al. |
| 2019/0177086 | A1 | | 6/2019 | Mathi et al. |
| 2020/0002105 | A1 | * | 1/2020 | Aljallis .................. B61B 10/02 |
| 2020/0004252 | A1 | * | 1/2020 | Aljallis .................. B61B 10/02 |
| 2020/0087064 | A1 | | 3/2020 | Hendrix et al. |

* cited by examiner

SYSTEMS AND METHODS FOR TRANSPORTING CONTAINERS

CROSS-REFERENCE TO RELATED APPLICATIONS

This application is a continuation of U.S. patent application Ser. No. 16/448,578, filed Jun. 21, 2019, which claims priority to U.S. Provisional Patent Application No. 62/692,522 entitled "Container Filling" and filed Jun. 29, 2018, U.S. Provisional Patent Application No. 62/692,544 entitled "Container Quick-Release" and filed Jun. 29, 2018, U.S. Provisional Patent Application No. 62/692,550 entitled "Robotic Container Connection" and filed Jun. 29, 2018, U.S. Provisional Patent Application No. 62/692,606 entitled "Container Transportation" and filed Jun. 29, 2018, which are all hereby incorporated by reference in their entireties.

TECHNICAL FIELD

Among other things, the present application relates to automated transportation of containers.

BACKGROUND

Warehouses can store many different kinds of items in bins (i.e., longer term storage containers). When a customer places a remote order (e.g., an online order), an employee can load the ordered items from the bins into pockets (i.e., shorter term storage containers). The pockets can be moveably suspended from a rail system. Motors in the rail system can slide (e.g., roll) the pockets along tracks from a loading station to a packing station.

When a pocket arrives at a packing station, an employee can manually remove the pocket and/or the item stored therein. The employee can place the item in a box (e.g., a shipping container). The process can be repeated until the box contains the customer's complete order. The employee can mark the packed box for shipment. A customer's order can include many different items and a warehouse can receive many different simultaneous orders. As a result, the rail system may incorporate thousands of pockets. When pockets are transferred to various locations in the warehouse, an employee may need to manually move the pockets and/or manually remove the pockets from the rail system to another system. Such manual removal can be time-consuming.

SUMMARY

Among other things, a connection assembly for motion along a rail is disclosed. The connection assembly can include a first plate assembly, a second plate assembly, and a release assembly. The first plate assembly can include a first base, a first bearing mounted to the first base, and a first stop mounted to the first base. The second plate assembly can be disposed proximate the first plate assembly. The second plate assembly can include a second base, a second bearing mounted to the second base, a second stop mounted to the second base, and a post mounted to the second base.

The release assembly can include a rod and a spring. The rod can include an outward extension. The spring can be disposed between the extension and the second stop. The release assembly can be configured to occupy: a first state such that the spring pushes the extension against the first stop and thereby biases the first base away from the second base; and a second state such that the spring pushes the extension against the post.

BRIEF DESCRIPTION OF THE FIGURES

The Figures show some of the illustrative embodiments disclosed herein. As further explained below, the claimed inventions are not limited to the illustrative embodiments and therefore are not limited to the embodiments shown in the Figures.

For clarity and ease of reading, some Figures omit views of certain features. The relative dimensions shown in the Figures can be aspects of a few illustrative embodiments. Therefore, relative dimensions shown in the Figures can serve as original support. Other illustrative embodiments lack any dimensional relationship to the Figures. The claimed inventions are not limited to any absolute or relative dimensions shown in the Figures unless explicitly stated otherwise.

The present disclosure generally uses the terms "longitudinal", "transverse", and "vertical" to give the reader context when viewing the Figures. Referring to the Figures, depth along the X-axis can be "transverse", depth along the Y-axis can be "longitudinal", and depth along the Z-axis can be "vertical". The X, Y, and Z-axes are consistent across the Figures.

Figure 1:
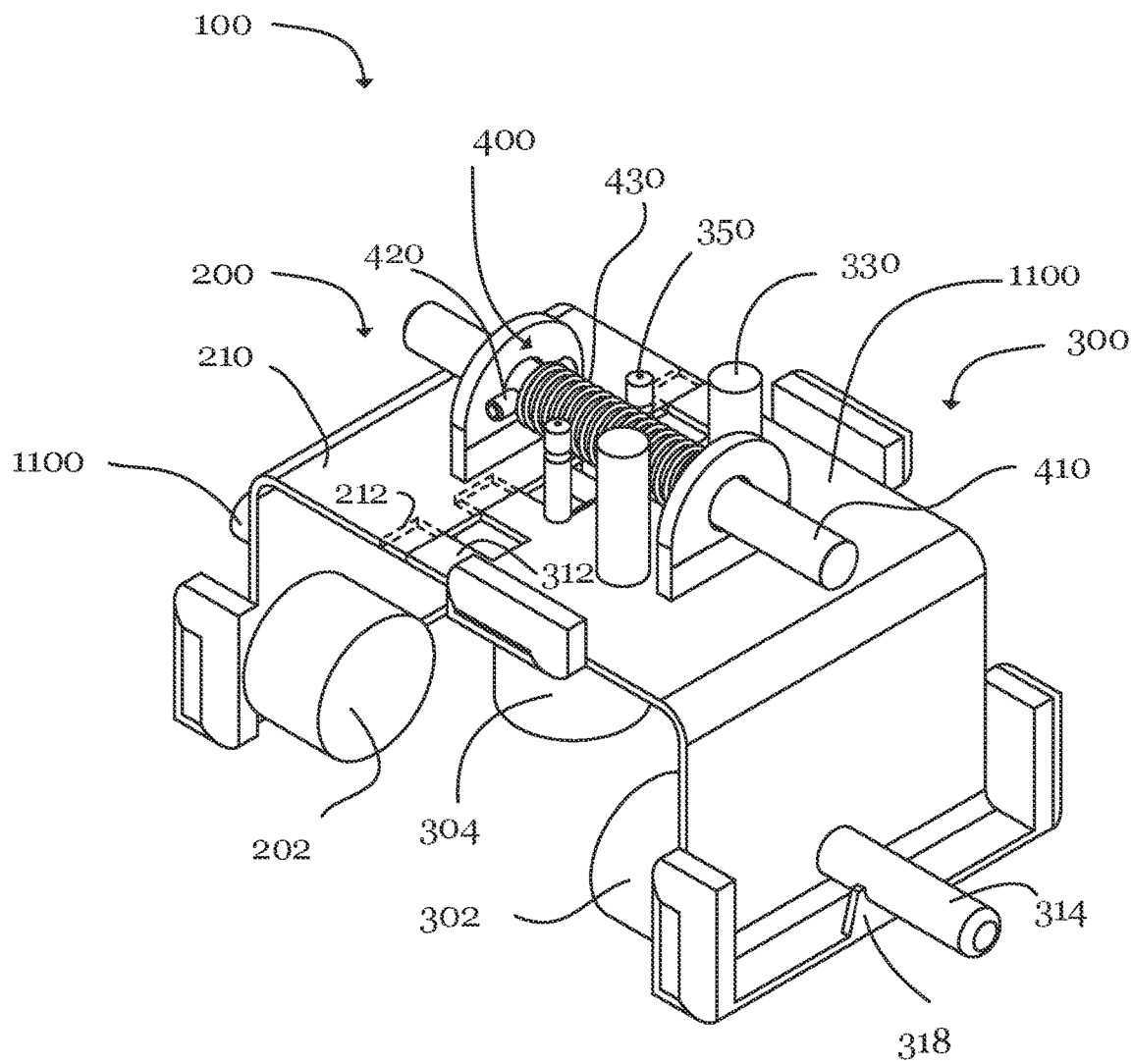

FIG. 1 is an isometric view of a container connection assembly ("CCA"), in accordance with some embodiments.

Figure 2:
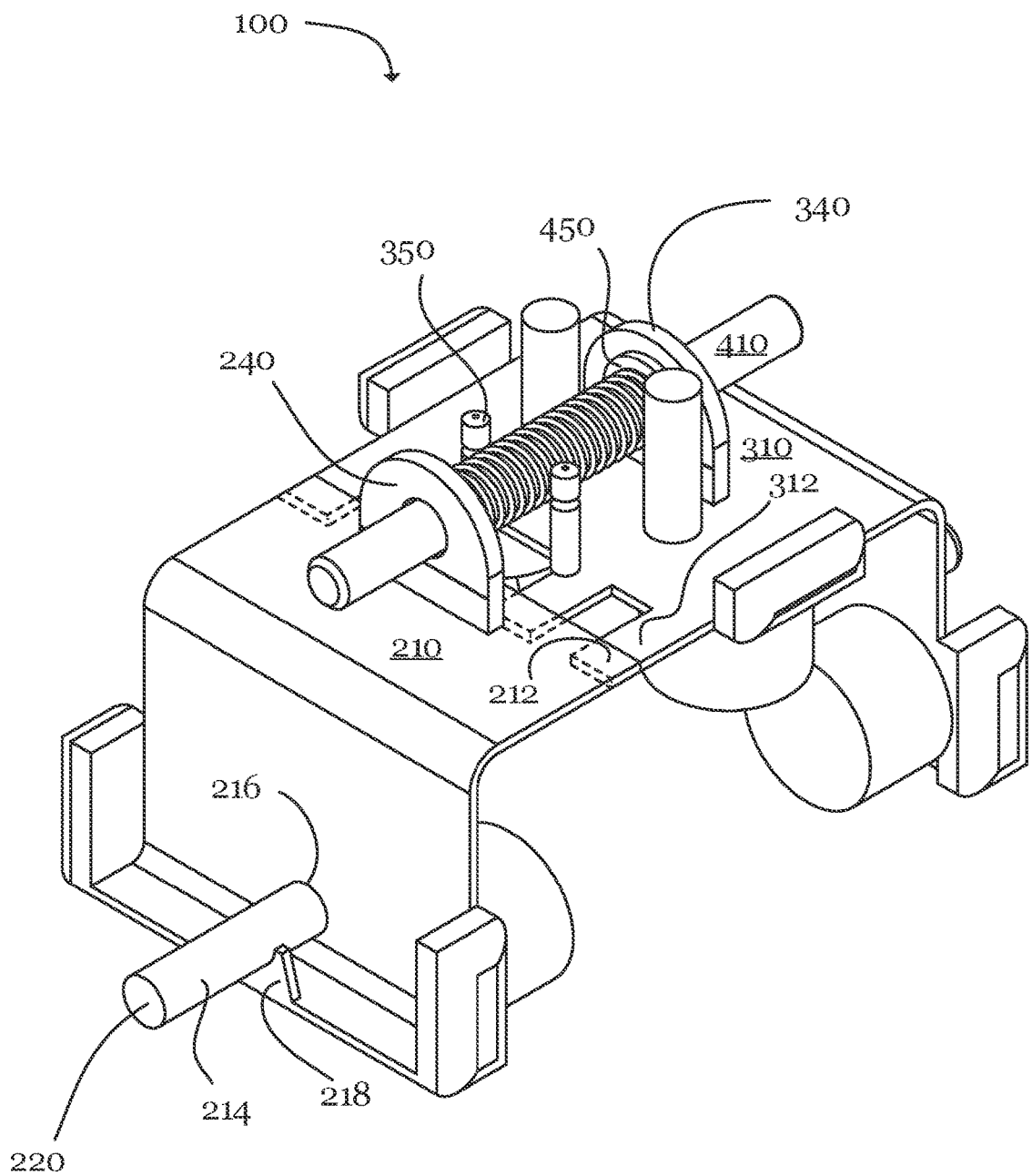

FIG. 2 is an isometric view of the CCA in FIG. 1, in accordance with some embodiments.

Figure 3:
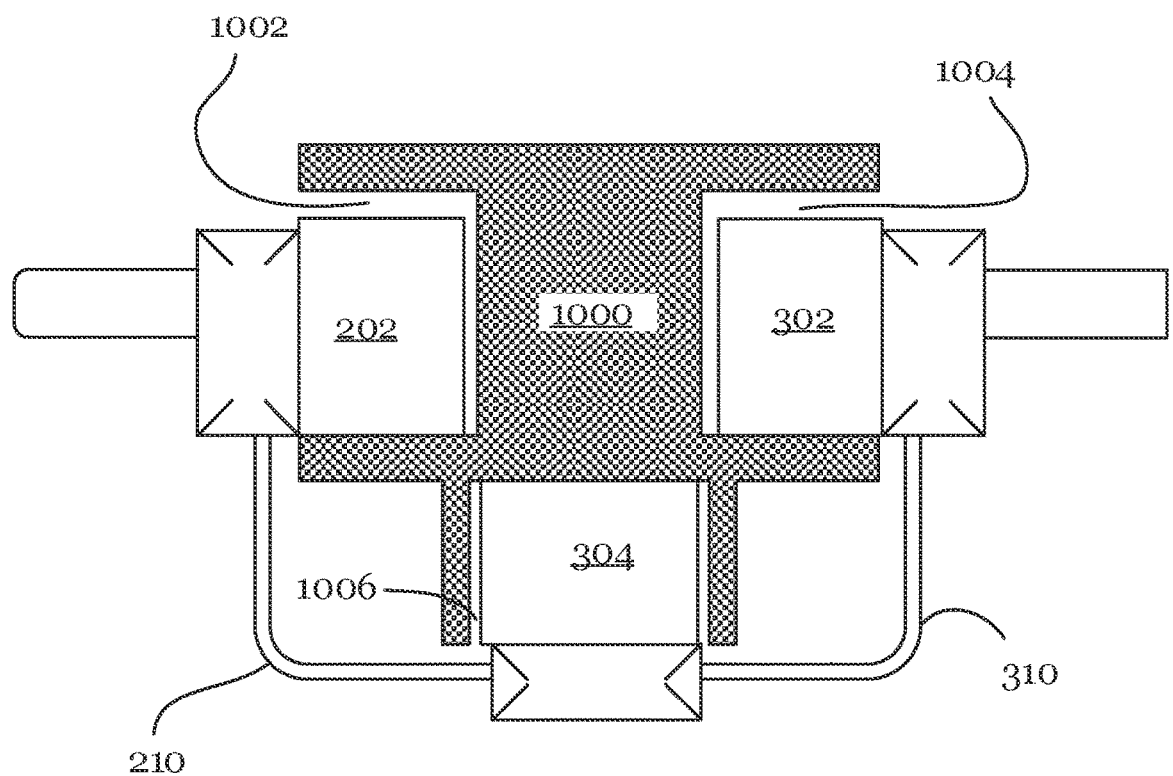

FIG. 3 is a schematic elevational view of a portion of the CCA in FIG. 1 in a fully coupled state and moveably disposed in a rail, in accordance with some embodiments. The rail is shown in cross section. The CCA is in a different orientation than shown in FIG. 1.

Figure 4:
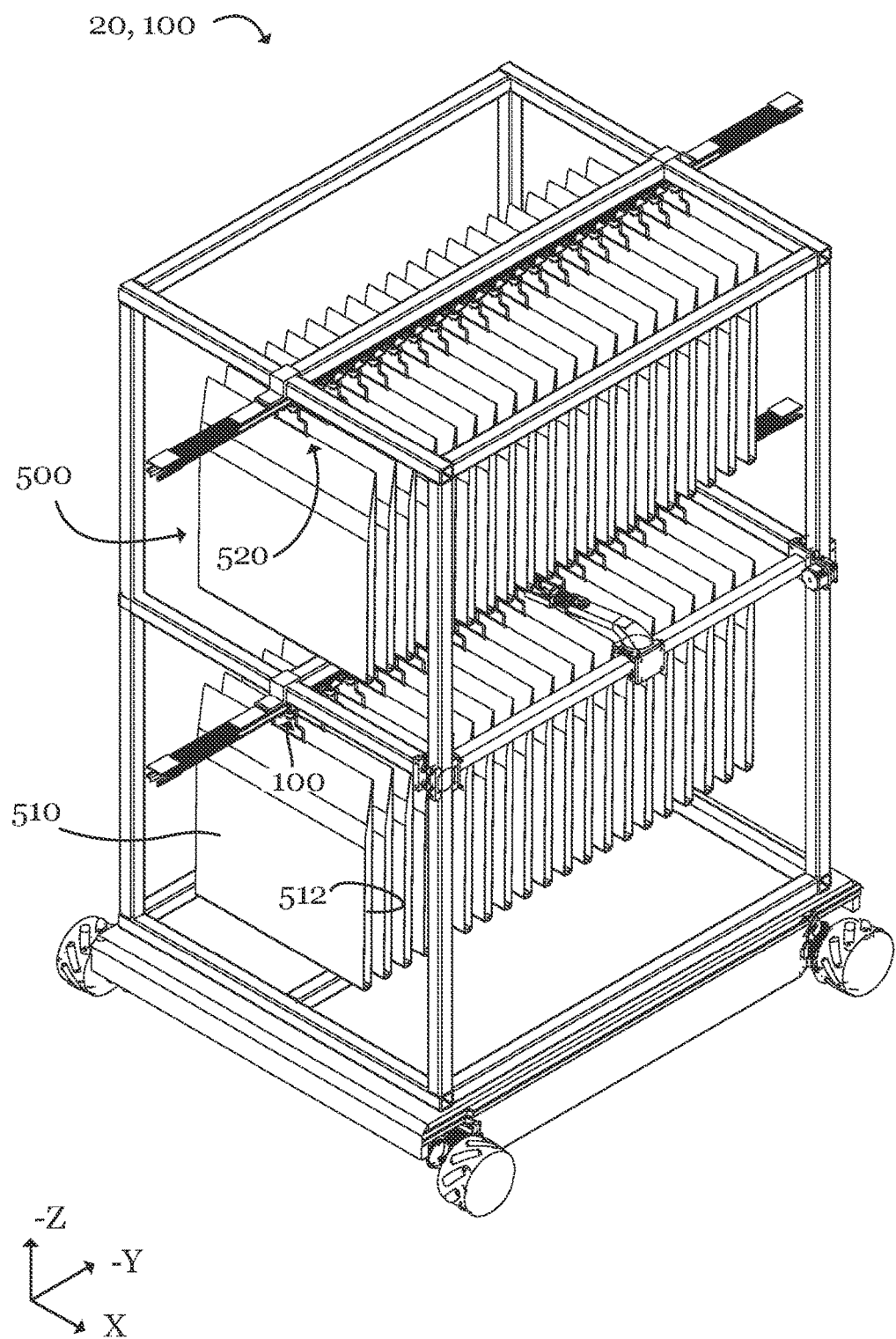

FIG. 4 is a view of a vehicle including a plurality of containers and rails, in accordance with some embodiments. Each container can include the CCA in FIG. 1. Each CCA can be disposed as shown in FIG. 3.

Figure 5:
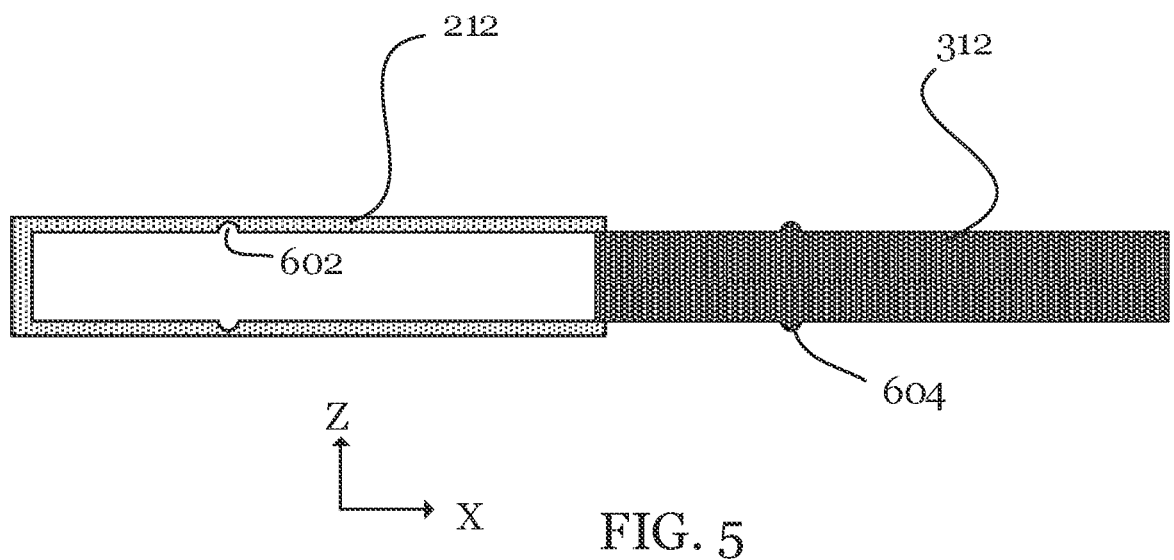

FIG. 5 is a schematic front elevational view of first and second retainers of the CCA in FIG. 1 in an uncoupled state, in accordance with some embodiments. FIG. 5 can represent a cross section from plane 5-5 in FIG. 8.

Figure 6:
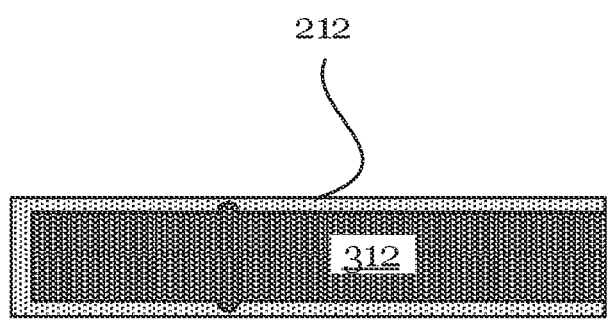

FIG. 6 is from the same perspective as FIG. 5, but shows the first and second retainers of the CCA in FIG. 1 in a fully coupled state, in accordance with some embodiments.

Figure 7:
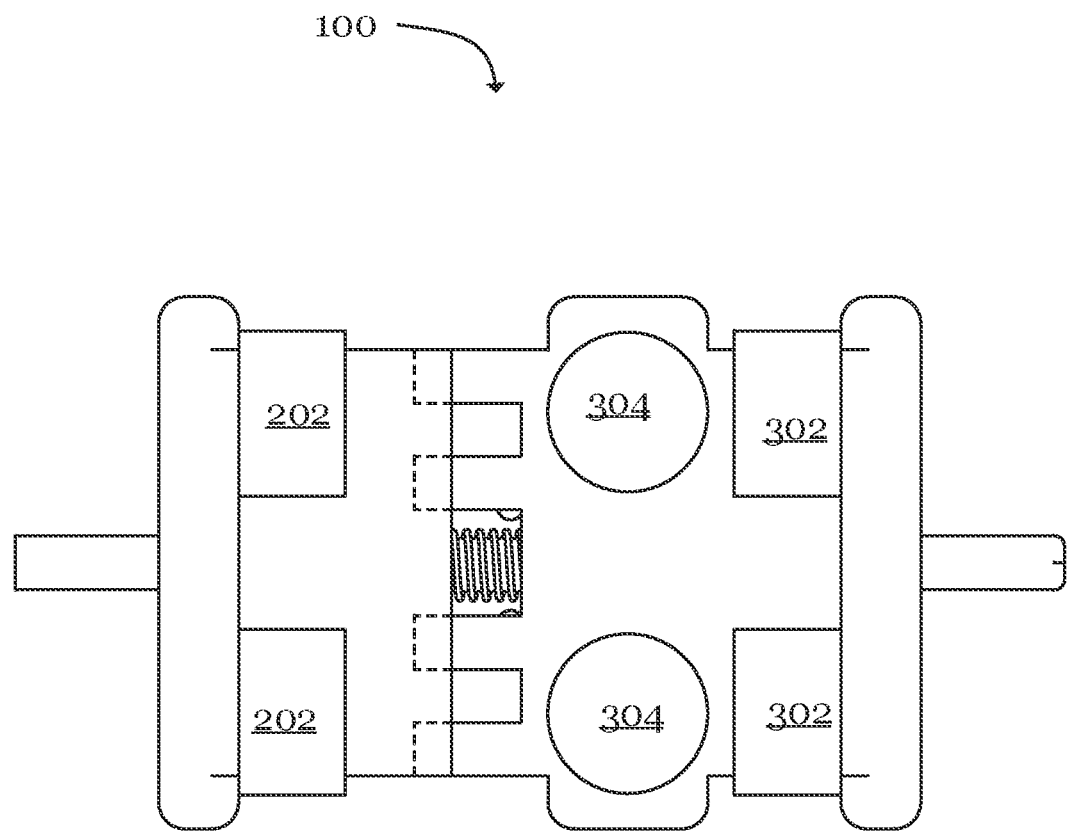

FIG. 7 is a bottom plan view of the CCA in FIG. 1, in accordance with some embodiments.

Figure 8:
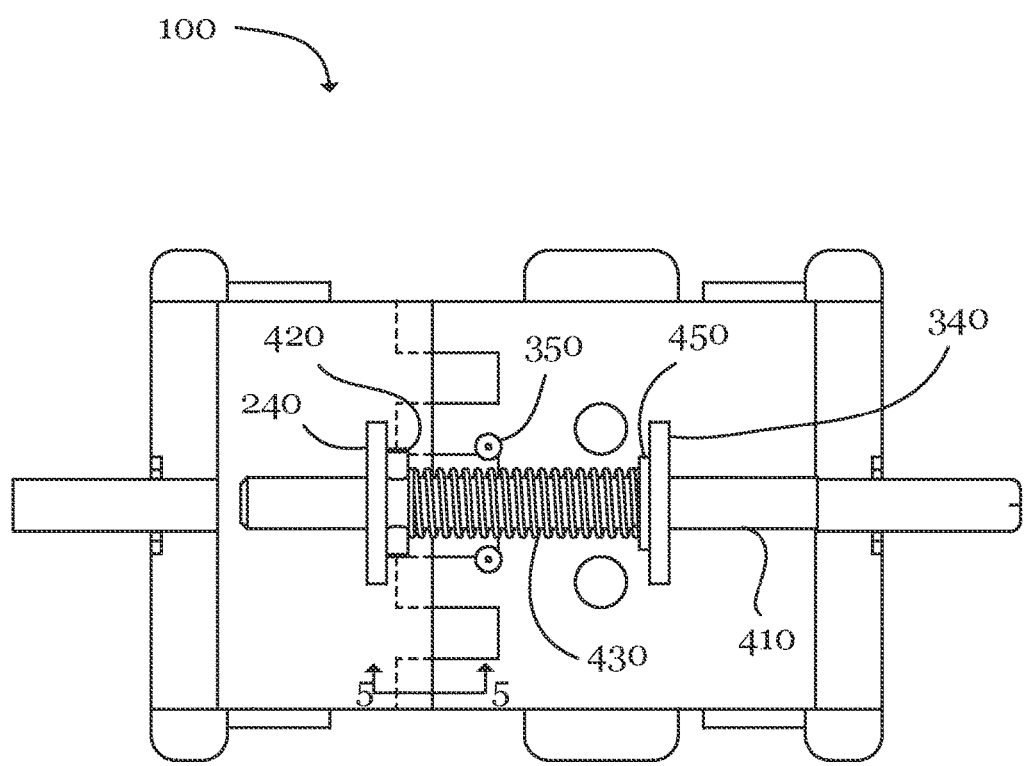

FIG. 8 is a top plan view of the CCA in FIG. 1, in accordance with some embodiments.

Figure 9A:
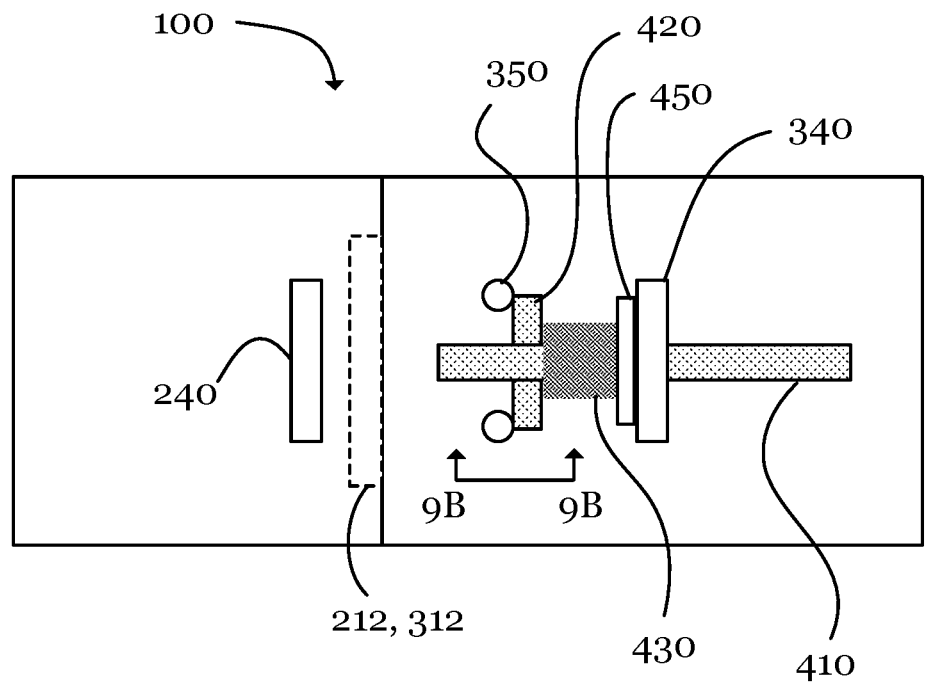

FIG. 9A is a schematic top plan view of the CCA in FIG. 1 with alternate first and second retainers, in accordance with some embodiments. The CCA is in a fully coupled resting position. For clarity, a spring is identified as a box with a first stippling pattern while a rod is identified with a second stippling pattern.

Figure 9B:
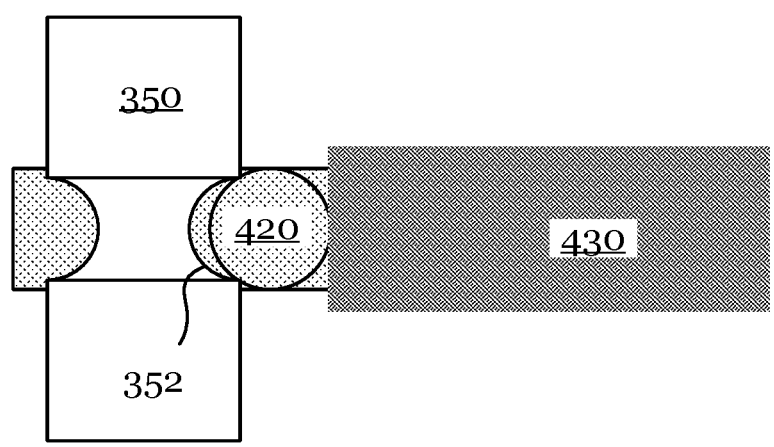

FIG. 9B is a schematic side elevational view from plane 9B-9B in FIG. 9A, in accordance with some embodiments.

Figure 10:
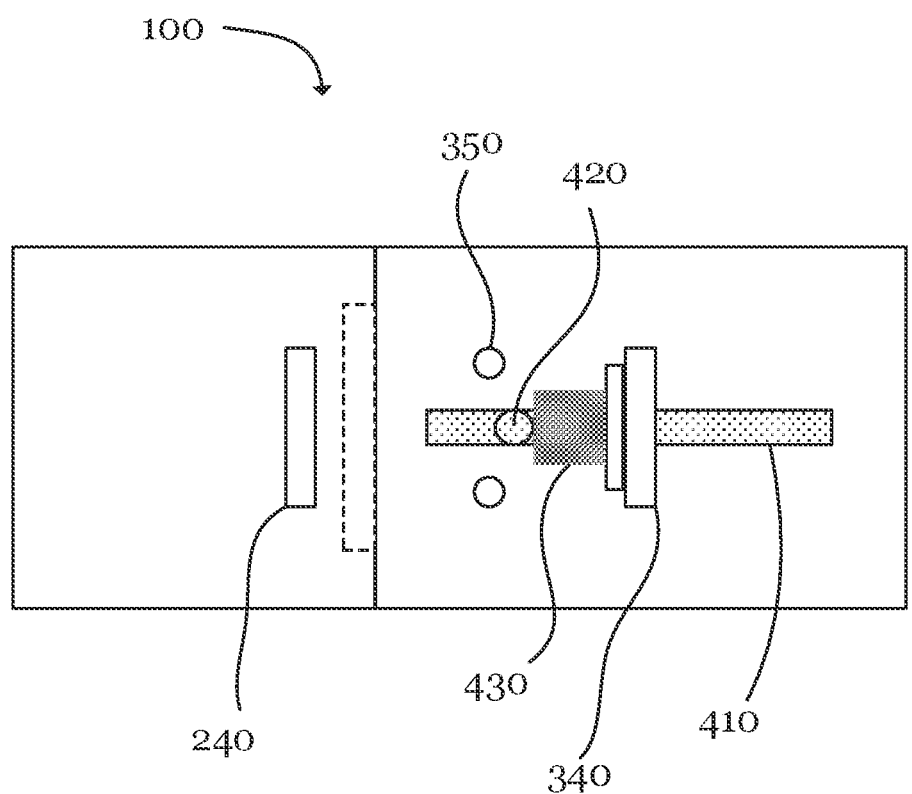

FIG. 10 is a schematic top plan view of the CCA in FIG. 9A, in accordance with some embodiments. The CCA remains fully coupled. The rod has been twisted 90 degrees.

Figure 11:
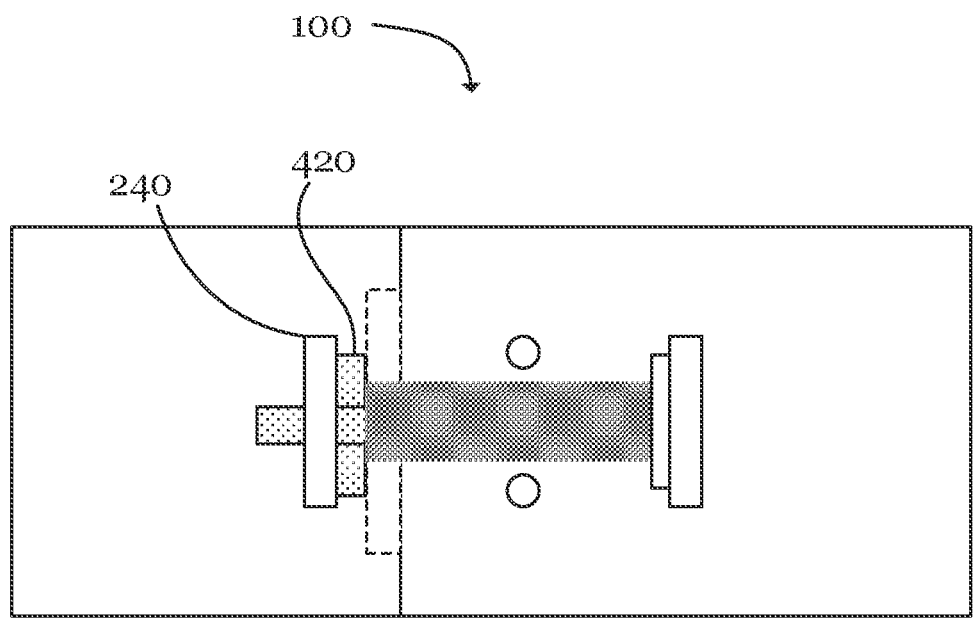

FIG. 11 is a schematic top plan view of the CCA in FIG. 9A, in accordance with some embodiments. The CCA is in the process of decoupling as spring force overcomes retaining force.

Figure 12:
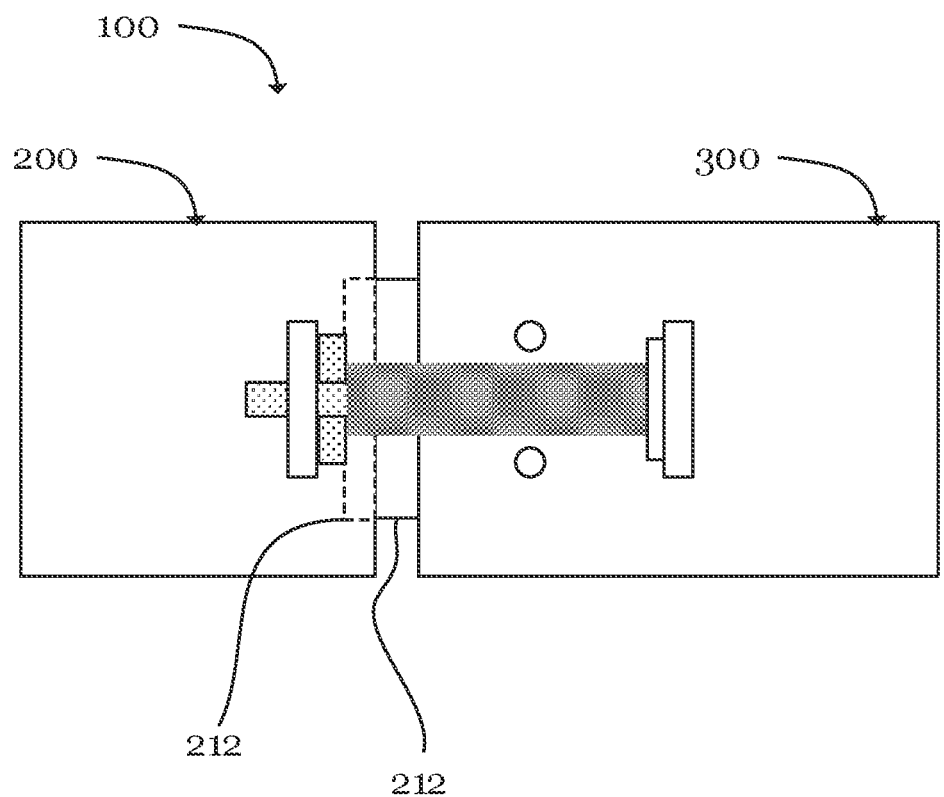

FIG. 12 is a schematic top plan view of the CCA in FIG. 9A, in accordance with some embodiments. The CCA is decoupled.

Figure 13:
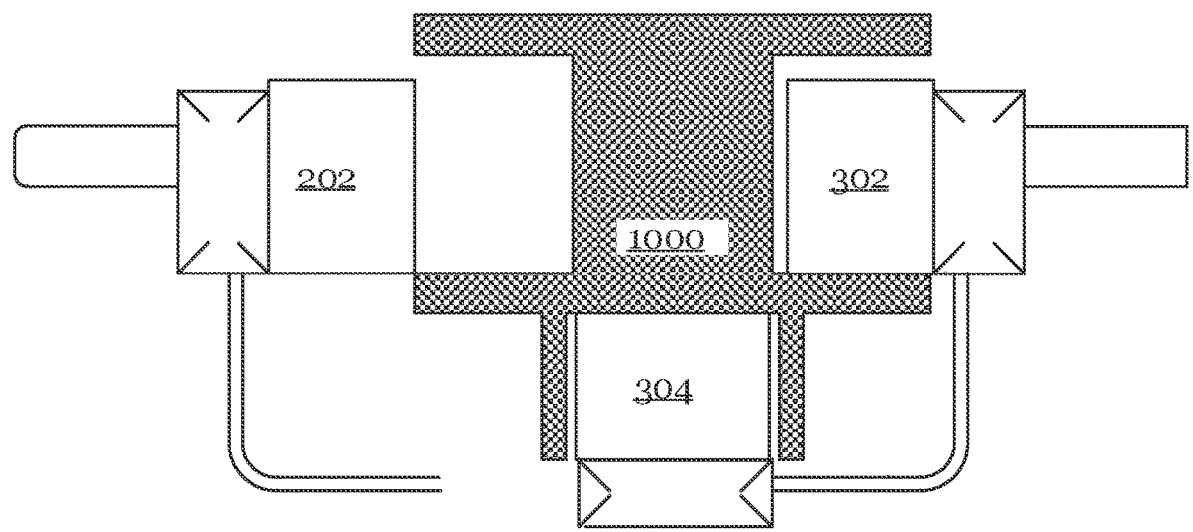

FIG. 13 is a schematic elevational view of the CCA in FIG. 9A, in accordance with some embodiments. FIG. 13 can be from the same perspective as FIG. 3. The CCA has been decoupled to an extent sufficient to remove the CCA from a rail. The CCA can be in the same position shown in FIG. 12 or further decoupled.

Figure 14:
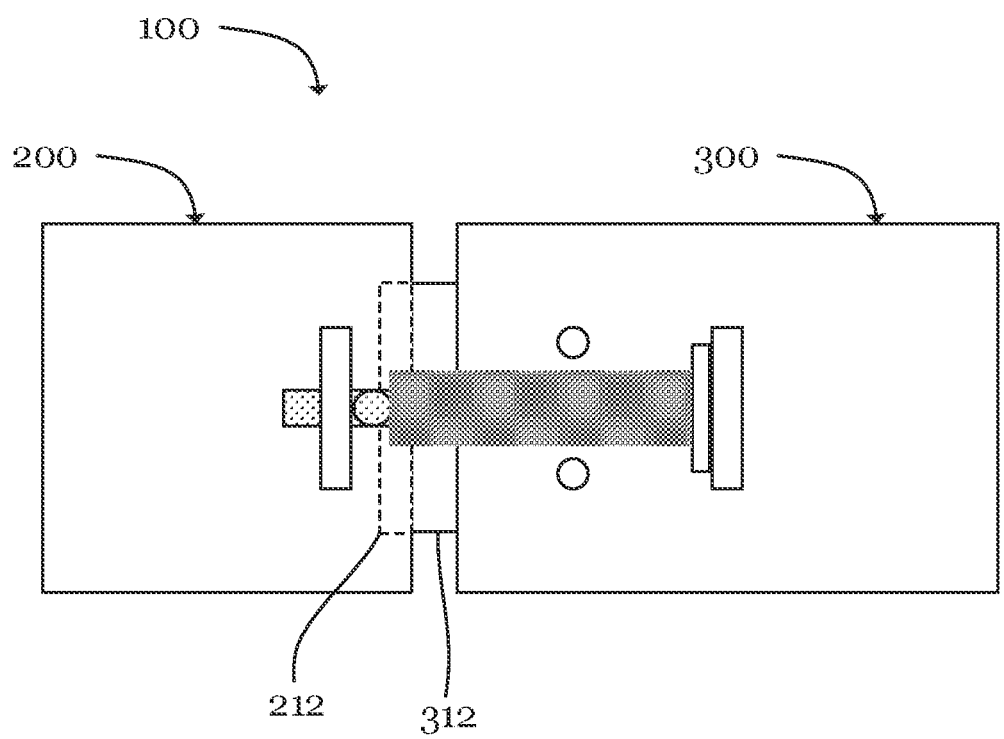

FIG. 14 is a schematic top plan view of the CCA in FIG. 9A, in accordance with some embodiments. The CCA is in the process of recoupling, but is still decoupled. The rod has been rotated 90 degrees.

Figure 15:
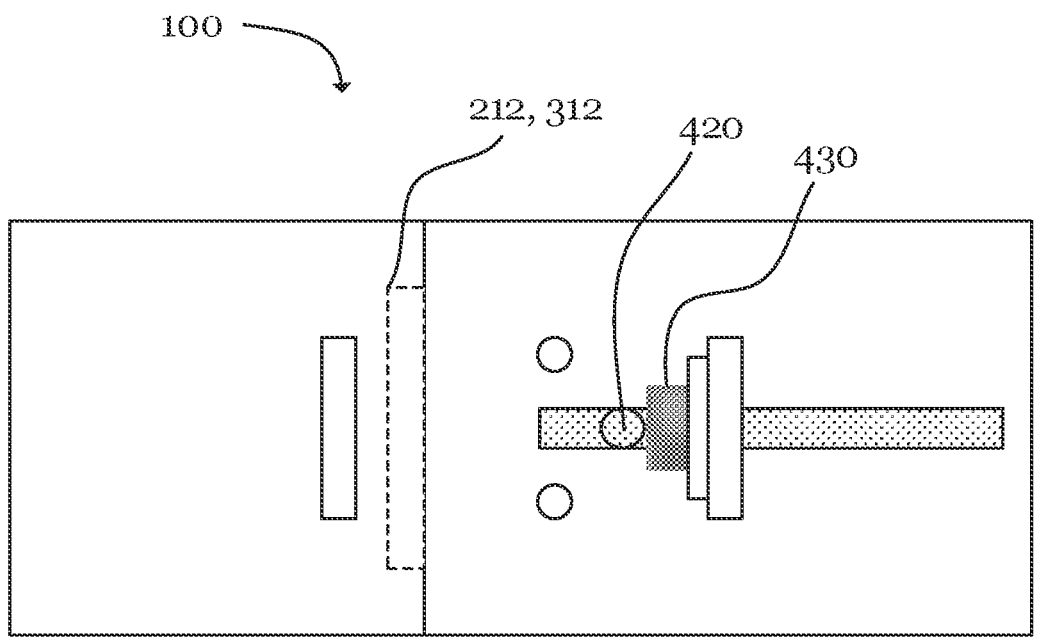

FIG. 15 is a schematic top plan view of the CCA in FIG. 9A, in accordance with some embodiments. The CCA has been recoupled. The rod has been transversely pushed such that cylindrical projections thereof have cleared posts.

Figure 16:
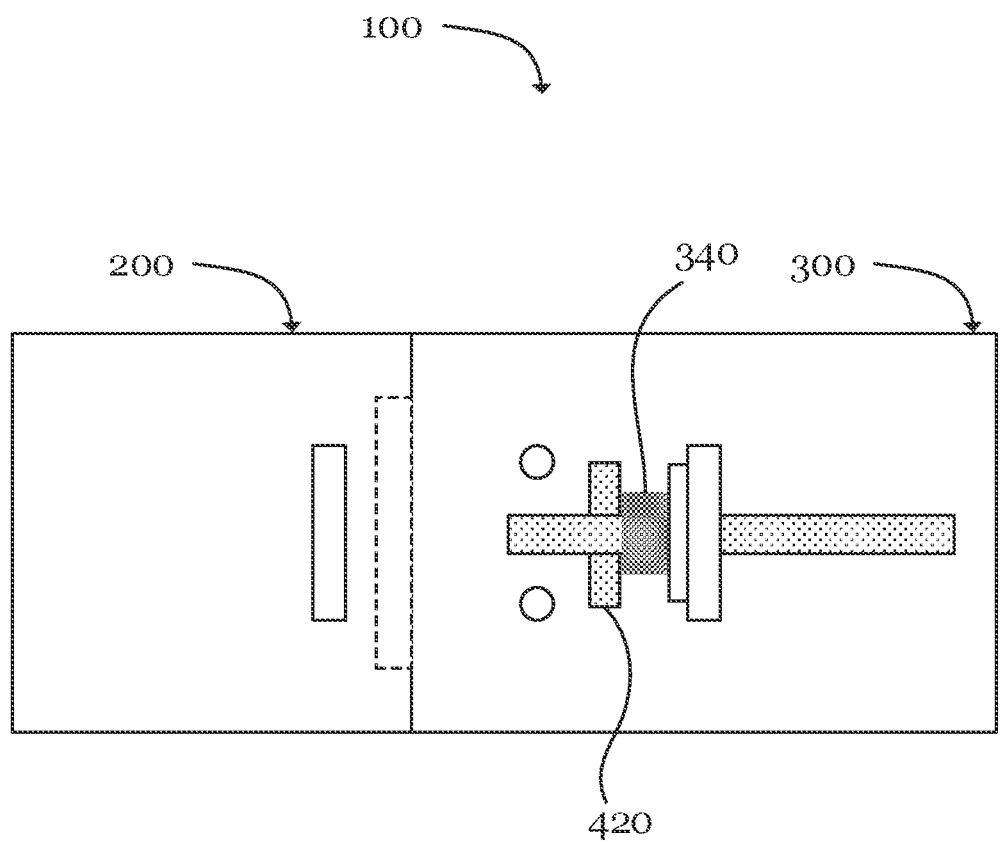

FIG. 16 is a schematic top plan view of the CCA in FIG. 9A, in accordance with some embodiments. The CCA remains recoupled. The rod has been rotated 90 degrees. The rod has been released such that the spring is pushing the rod back into engagement with the posts.

Figure 17:
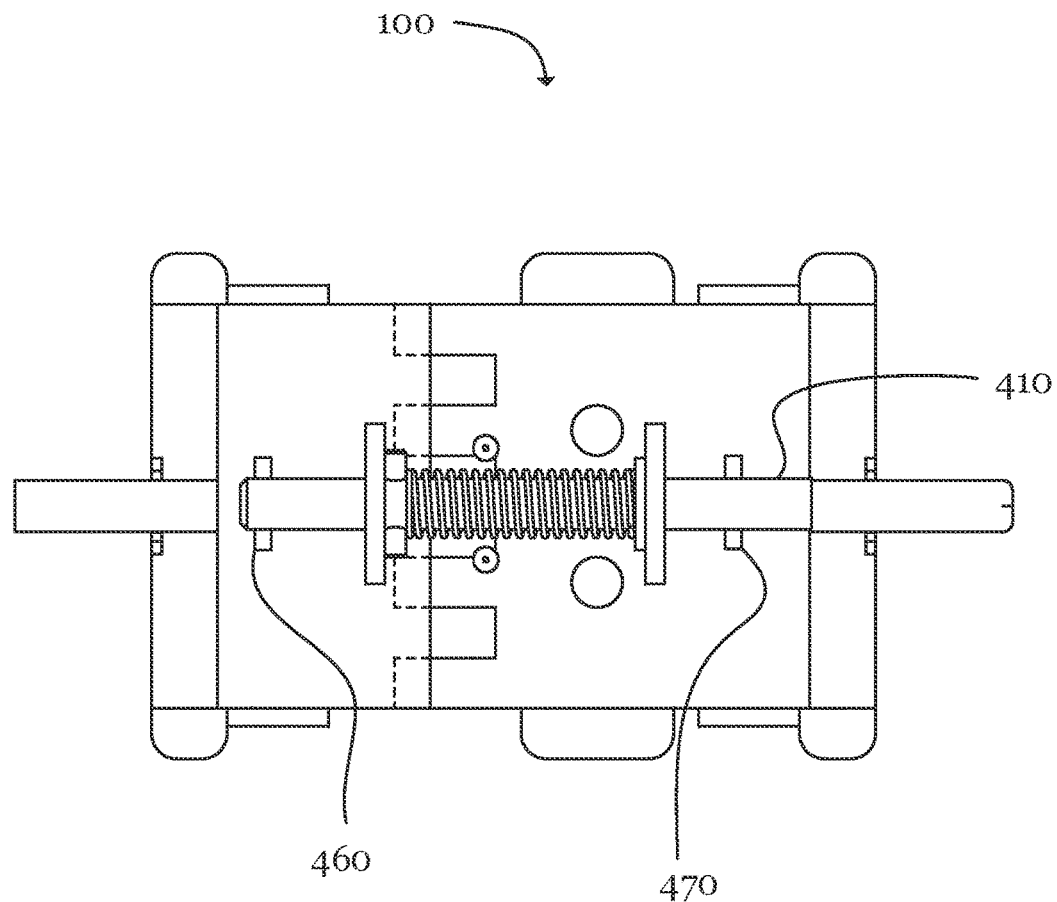

FIG. 17 is a schematic top plan view of the CCA in FIG. 1 showing additional projections for keeping the CCA linked together, even when fully decoupled.

DETAILED DESCRIPTION

While the features, methods, devices, and systems described herein may be embodied in various forms, there are shown in the drawings, and will hereinafter be described, some illustrative (i.e., example) embodiments. The claimed inventions are not limited to the illustrative embodiments. Therefore, some implementations of the claimed inventions will have different features than those set out in this disclosure.

Further, implementations of the claimed inventions can make changes with respect to the claims without departing from the spirit or scope of the application. Therefore, the claimed inventions are intended to embrace their full-range of equivalents.

Unless otherwise indicated, any directions reflect the orientations of the components shown in the corresponding drawings and do not limit the scope of the present disclosure. Any absolute term (e.g., large, small) can be replaced with a corresponding relative term (e.g., larger, smaller).

FIGS. 1 and 2 are isometric views of a container connection assembly ("CCA") 100. CCA 100 can include a first transverse plate assembly 200, a second transverse plate assembly 300, and a release assembly 400. First plate assembly 200 can include one or more first transverse bearing assemblies 202 configured to longitudinally slide (e.g., roll) within a rail 1000 (FIG. 3). Second plate assembly 300 can include one or more second transverse bearing assemblies 302 and one or more vertical bearing assemblies 304 configured to longitudinally slide (e.g., roll) within rail 1000 (FIG. 3).

FIG. 3 schematically shows a cross-section of rail 1000, to which CCA 100 is moveably connected. Note that CCA 100 has a different vertical orientation in FIG. 3 than in FIGS. 1 and 2. Rail 1000 can define a first transverse and longitudinally extending channel 1002 in which the one or more first transverse bearing assemblies 202 are slideably (e.g., rollably) disposed. Rail 1000 can define a second transverse and longitudinally extending channel 1004 in which the one or more second transverse bearing assemblies 302 are slideably disposed. Rail 1000 can define a third vertical and longitudinally extending channel 1006 in which the one or more vertical bearing assemblies 304 are slideably disposed. FIG. 3 omits various features of CCA 100 for clarity.

Referring to FIG. 3, bearing assemblies 202, 302, 304 (also called bearings) can both enable longitudinal movement along rail 1000 and retain CCA 100 within rail 1000. First transverse bearing assemblies 202 can discourage movement of CCA 1000 along the positive Z-axis and along the positive X-axis. Second transverse bearing assemblies 302 can discourage movement of CCA 1000 along the positive Z-axis and along the negative X-axis. Vertical bearing assemblies 304 can discourage movement of CCA along the X-axis (both positive and negative) and further discourage movement of CCA 100 along the negative Z-axis.

Bearings 202, 302, 304 can be roller bearings. Bearings 202, 302, 304 can be rotatable about the central axes (not labeled) of the cylinders shown in the Figures. Alternatively, the cylinders shown in the Figures can serve as housings confining circumferentially disposed bearings, each respectively rotatable about a different central axis (not shown).

FIG. 4 shows an embodiment of rail 1000 disposed in a vehicle 2000. According to other embodiments (not shown), rail 1000 is permanently fixed in a static position (e.g., suspended from a warehouse ceiling). In FIG. 4, rail 1000 suspends a plurality of containers 500. Each container 500 can include a vessel 510 defining a chamber 512 for storing an item (not shown), a linkage assembly 520, and a CCA 100. CCA 100 can moveably dispose and retain container 500 in rail 1000. Linkage assembly 520 can couple vessel 510 with CCA 100.

It may be desirable to temporarily decouple a container 500 from rail 1000. Decoupling would, for example, enable a user to reorder containers 500 or to remove containers 500 for repair. But, as shown in FIG. 3, and for the reasons described above, CCA 100 can be incapable of sufficient movement in the transverse and vertical directions to remove container 500 from rail 1000.

As such, and according to some embodiments, a container 500 can only be removed from rail 1000 by: (a) disassembling container 500 or (b) sliding (e.g., rolling) container 500 until reaching a longitudinal end 1010 of rail 1000 (see FIG. 4). If containers 500 (e.g., containers 500a and 500b) are longitudinally disposed between the rail end 1010 and the container 500 to be removed (e.g, container 500c), then disassembly may be a more attractive option than sliding the container 500 to be removed off a longitudinal rail end 1010.

Accordingly, various embodiments of CCA 100 enable quick disassembly (also called quick release) to decouple a container 500 from rail 1000 without sliding container 500 from a longitudinal end 1010 of rail 1000. More specifically, and according to some exemplary embodiments, first transverse plate assembly 200 can be decoupled (e.g., partially decoupled) from second transverse plate assembly 300 until transverse space sufficient for removing CCA 100 from rail 1000 is defined between first and second transverse bearings 202, 302.

According to some embodiments (discussed below), first and second transverse plate assemblies 200, 300 can be completely disconnected from each other. According to other embodiments (discussed below), first and second transverse plate assemblies 200, 300 remain linked together by release assembly 400 when fully decoupled. Release assembly 400 can simplify the decoupling process by biasing CCA 100 to the decoupled (i.e., the at least partially decoupled) state. These, and other features, are further discussed below.

Referring to FIGS. 1 and 2, first transverse plate assembly 200 can include a first corner plate 210 (also called a "first base") with an L-shaped profile in the X-Z plane. Second transverse plate assembly 300 can include a second corner plate 310 (also called a "second base") with an L-shaped profile in the X-Z plane.

First corner plate 210 can include first retainers 212. Second corner plate 310 can include second retainers 312. First and second retainers 212, 312 can cooperate to lock first and second transverse plate assemblies 200, 300 in the fully-coupled state. According to some embodiments, first transverse bearings 202 and second transverse bearings 302 are equidistant from vertical bearings 304 when plate assemblies 200, 300 are in a fully coupled state. As further discussed below, FIGS. 1 and 2 can show CCA 100 in a non-fully coupled state.

As shown in FIGS. 1 and 2, first retainers 212 can be pockets (i.e., blind holes) for receiving corresponding second retainers 312 (shown as fingers in the exemplary embodiments of FIGS. 1 and 2) of second transverse plate assembly 200. If pockets, then first retainers 212 can include snap features for engaging with counter-snap features of second retainers 312.

For example, FIG. 5 shows first retainer 212 as a pocket defining longitudinally extending grooves 602 for receiving vertical projections 604 extending from second retainer 312 (which can be the finger shown in FIGS. 1 and 2). FIG. 6 shows the vertical projections 604 engaging grooves 602 to thereby retain first and second transverse plate assemblies 200, 300 in the fully coupled state. Although not shown, second retainer 312 can define grooves 602 and first retainer 212 can include projections 604.

The above discussed features are only exemplary. First and second retainers 212, 312 can have any structure suitable for fully coupling first and second transverse plate assemblies 200, 300. For example, first and second retainers 212, 312 can be magnets with poles oriented to bias and bind first and second transverse plate assemblies 200, 300 into the fully coupled state.

The one or more first transverse bearings 202 can be directly mounted to first corner plate 210. A first transverse rod 214 can be directly secured to corner plate 210 at a transverse end 216. An intermediate section of transverse rod 214 can be supported by, and rest directly on, a cradle 218 for reducing bending stress. The bending stress can be induced by one or more features secured to the opposing transverse end 220 of transverse rod 214.

According to some embodiments, linkage assembly 520 connects with the longitudinal end 220 of transverse rod 214 (e.g., the transverse rod 214 can be an aspect of linkage assembly 520). Thus, at least a portion of the weight of items disposed in vessel 510 can be transmitted through transverse rod 214, from corner plate 210 into first transverse bearings 202, and onto rail 1000 via first transverse channel 1002. As shown in FIG. 1, second transverse plate assembly 300 can include the same features (i.e., a transverse rod 314, a cradle 318, etc.). The central axis of second transverse rod 314 can be collinear with the central axis of first transverse rod 214, as shown in FIG. 8.

For similar reasons, a pair of vertical rods 330 can include longitudinal ends 332 directly secured to second corner plate 310. As with transverse rods 214, 314, vertical rods 330 can be aspects of linkage assembly 520 or in mechanical communication therewith. Vertical rods 330 can transmit the mechanical load of items disposed within vessel 510 to second bearings 302 (as shown in FIG. 3 vertical bearings 304 can be for alignment, but not for bearing weight).

Referring to FIG. 2, a first stopping plate 240 (also called a "first stop") can vertically project from first corner plate 210. A second stopping plate 340 (also called a "second stop") can vertically project from second corner plate 310. Plates 240, 340 can define circular apertures 242, 342 with collinear central axes. A pair of posts 350 can vertically project from second corner plate 310. Plates 240, 340 along with posts 350 can interact with release assembly 400.

Referring to FIG. 8, release assembly 400 can include a rod 410 disposed within the apertures 242, 342, a transversely compressible spring 430 helically coiled thereabout, and a washer 450 stopped directly against second stopping plate 340 against which one end of spring 430 is seated. Rod 410 can include opposing cylindrical projections 420 (also called "outward extensions") against which the opposing end of spring 430 is seated.

Rod 410 can be rotatable about its central axis and translatable in the transverse direction, subject to cylindrical projections 420 interfering with posts 350 and first stopping plate 240. Spring 430 can exist in a compressed state. The biasing force that spring 430 exerts can be transversely transmitted as rod 410 bears against (a) posts 350 or (b) first stopping plate 240.

When rod 410 (by virtue of projections 420 in FIG. 1) bears against posts 350, then spring 430 is exclusively squeezed between components directly affixed to second corner plate 310. As such, the net transverse force in the positive X direction applied to second stopping plate 340 is canceled out by the net transverse force in the negative X direction applied to posts 350.

However, when spring 430 compressively bears on first stopping plate 240, net transverse motion can occur since first and second corner plates 212, 312 are separable when the locking force between retainers 212, 312 is overcome. More specifically, spring 430 can transmit a force in the negative X direction through projections 420, through first stopping plate 240, and into first corner plate 210. Spring 430 can simultaneously transmit force in the positive X direction through washer 450, through second stopping plate 340, and into second corner plate 320. As such, spring 430 can bias first and second corner plates 210, 310 transversely apart (i.e., release first corner plate 210 from second corner plate 310).

If the biasing force exerted by spring 430 is sufficient to overcome the transverse locking force exerted by first and second retainers 212, 312, then release assembly 400 can separate first transverse plate assembly 200 from second transverse plate assembly 300 at least until CCA 100 is extractable from rail 1000 by virtue of transverse bearings 202, 302 being simultaneously withdrawable from channels 1002, 1004. According to various embodiments, spring 430 is configured to exert a biasing force in excess of the locking force and thus separate first and second transverse plate assemblies 200, 300 until CCA 100 (and thus container 500) is extractable from rail 1000.

FIGS. 9A-16 schematically illustrate the various states and effects of release assembly 400. In FIG. 9A, spring 430 is compressively retained between posts 350 and second stopping plate 340. Projections 420 are seated within ring grooves 352 defined in posts 420 such that a portion of each projection 420 transversely arcs therein (FIG. 9B). In this embodiment, second transverse plate assembly 300 includes a single retainer 312, which is centrally disposed and transversely extending finger configured to be locked (magnetically, mechanical, or otherwise, as discussed above) within first transverse plate assembly 200. The opposing transverse forces that spring 430 exerts cancel each other out. First and second transverse plate assemblies 200, 300 remain locked together.

In FIG. 10, rod 410 is twisted to align projections 420 with the vertical. As such, posts 350 no longer obstruct the transverse pathway defined between projections 420 and first stopping plate 240. Spring 430 pushes projections 420 toward first stopping plate 240. By FIG. 11, projections 420 have contacted first stopping plate 240 and spring 430, which is still compressed, biases first and second transverse plate assemblies 200, 300 apart. The spring biasing force exceeds the locking force that retainers 212, 312 exert, causing retainers 212, 312 to disengage.

In FIG. 12, the centrally disposed second retainer 312 has withdrawn from the pocket defined by first retainer 212. FIGS. 1 and 2 illustrate CCA 100 in an equivalent state. Spring 430 continues to decouple first and second transverse plate assemblies 200, 300 at least until reaching the state shown in FIG. 13 where CCA 100 is removable from rail 1000. According to some embodiments, FIG. 13 exaggerates the dimensions of bearings 202, 302, 304 relative to rail 1000 such that bearings 302, 304 are removable in the absence of first transverse bearings 202.

Recoupling can occur in reverse. In FIG. 14, rod 410 is twisted to misalign projections 420 and posts 350. In FIG. 15, rod 410 has been transversely pushed to compress (e.g., further compress) spring 430 and translate projections 420 beyond posts 350. Retainers 212, 312 have engaged. In FIG. 16, rod 410 has been twisted to realign projections 420 with posts 350. Spring 430 now pushes rod 410 into the state of FIG. 9.

Referring to FIG. 17, rod 410 can include a second pair of projections 460 and/or a third pair of projections 470 to prevent spring 430 from pushing first corner plate 210 until rod 410 releases from first aperture 242 and/or second aperture 342. As such, release assembly 400 can keep first and second transverse plate assemblies 200, 300 linked together, even when decoupled. Second and/or third projections 460, 470 can be disposed, and rod 410 can be sized, such that projections 460, 470 do not interfere with the above-discussed states or positions.

We claim:

1. A method for moving a vessel along a rail defining a pair of transverse and longitudinally-extending channels, the method comprising:
   coupling the vessel to a connection assembly comprising a first bearing mounted to a first base, a second bearing mounted to a second base, a post mounted to the second base, and a release assembly, wherein the first bearing and the second bearing are transversely oriented;
   slidably coupling the connection assembly to the rail by:
      positioning the first bearing in a first channel of the pair of channels,
      positioning the second bearing in a second channel of the pair of channels, and
      coupling the first base to the second base; and
   imparting motive force to the connection assembly via a motor to move the vessel along the rail.

2. The method of claim 1, wherein the connection assembly further comprises:
   a first stop mounted to the first base; and
   a second stop mounted to the second base.

3. The method of claim 2, wherein the release assembly comprises a rod and a spring, the rod comprising an extension, the spring being disposed between the extension and the second stop.

4. The method of claim 3, wherein:
   the rod is rotatable to make the extension extend either along a first direction or along a second direction that is perpendicular to the first direction; and
   the rod extends along a third direction that is perpendicular to both the first direction and the second direction.

5. The method of claim 4, wherein:
   the post obstructs the extension when the extension extends along the first direction and is pushed away from the second stop to move along the third direction; and
   the post does not obstruct the extension when the extension extends along the second direction and is pushed away from the second stop to move along the third direction.

6. The method of claim 4, wherein the release assembly is configured to occupy:
   a first state such that the spring pushes the extension pass the post with the extension extending along the second direction and against the first stop and thereby biases the first base away from the second base; and
   a second state such that the spring pushes the extension against the post with the extension extending along the first direction.

7. The method of claim 6, further comprising removing the connection assembly from the rail by:
   manipulating the release assembly to the second state to thereby decouple the first base and the second base;
   removing the first bearing from the first channel; and
   removing the second bearing from the second channel.

8. The method of claim 1, wherein the vessel is coupled to the connection assembly by a linkage assembly.

9. The method of claim 1, wherein:
   the first base comprises a first retainer; and
   the second base comprises a second retainer.

10. The method of claim 9, wherein:
    one of the first retainer and the second retainer comprises one or more fingers; and
    the other of the first retainer and the second retainer comprises one or more blind holes for receiving corresponding ones of the one or more fingers.

11. The method of claim 10, wherein coupling the first base to the second base comprises:
    positioning at least one of the fingers into at least one of the blind holes.

12. The method of claim 10, wherein:
    each of the blind holes defines a respective groove; and
    each of the fingers comprises a respective vertical projection for engaging a respective groove.

13. The method of claim 9, wherein:
    each of the first retainer and the second retainer comprises one or more magnets.

14. The method of claim 1, wherein the first bearing is mounted to the first base by a first transverse rod.

15. The method of claim 14, wherein the first transverse rod is supported by a first cradle defined by the first base.

16. The method of claim 1, wherein the connection assembly further comprises:
    a third bearing mounted to the second base, wherein the third bearing is vertically oriented.

17. A method for moving a vessel along a rail defining a pair of channels, the method comprising:

coupling the vessel to a connection assembly, wherein the connection assembly comprises:
  a first plate assembly comprising a first base, a first bearing mounted to the first base, and a first stop mounted to the first base,
  a second plate assembly disposed proximate to the first plate assembly, the second plate assembly comprising a second base, a second bearing mounted to the second base, a second stop mounted to the second base, and a post mounted to the second base, and
  a release assembly comprising a rod and a spring, the rod comprising an extension, the spring being disposed between the extension and the second stop;
slidably coupling the connection assembly to the rail by:
  positioning the first bearing in a first channel of the pair of channels,
  positioning the second bearing in a second channel of the pair of channels, and
  coupling the first base to the second base; and
imparting motive force to the connection assembly to move the vessel along the rail.

18. The method of claim 17, wherein:
the rod is rotatable to make the extension extend either along a first direction or along a second direction that is perpendicular to the first direction;
the rod extends along a third direction that is perpendicular to both the first direction and the second direction;
the post obstructs the extension when the extension extends along the first direction and is pushed away from the second stop to move along the third direction; and
the post does not obstruct the extension when the extension extends along the second direction and is pushed away from the second stop to move along the third direction.

19. The method of claim 18, wherein the release assembly is configured to occupy:
  a first state such that the spring pushes the extension pass the post with the extension extending along the second direction and against the first stop and thereby biases the first base away from the second base; and
  a second state such that the spring pushes the extension against the post with the extension extending along the first direction.

20. The method of claim 19, further comprising removing the connection assembly from the rail by:
  manipulating the release assembly to the second state to thereby decouple the first base and the second base;
  removing the first bearing from the first channel; and
  removing the second bearing from the second channel.

* * * * *